June 21, 1927.
R. W. RICHARDS
1,633,275
AWNING FOR WINDOWS
Filed Sept. 15, 1926   2 Sheets-Sheet 1
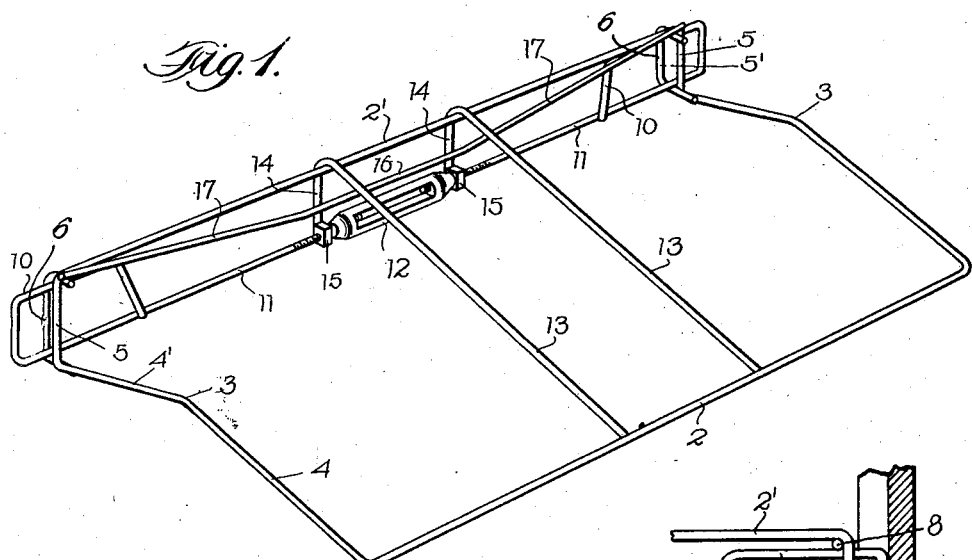
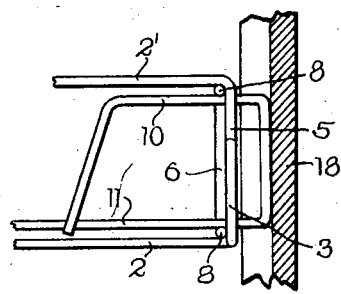
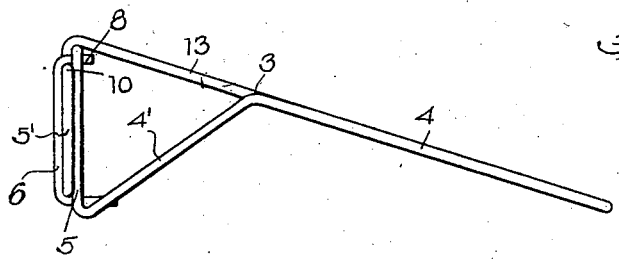
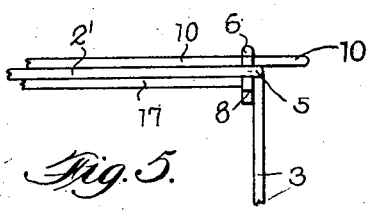
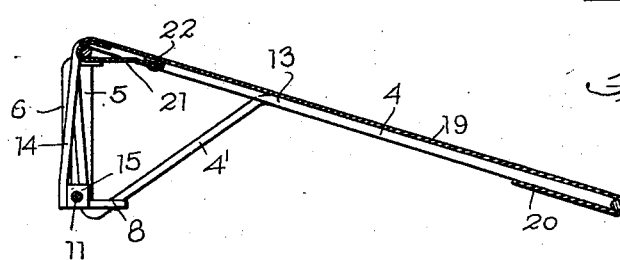
INVENTOR.
R. W. Richards
BY E. W. Anderson
ATTORNEY.

June 21, 1927.   1,633,275
R. W. RICHARDS
AWNING FOR WINDOWS
Filed Sept. 15, 1926   2 Sheets-Sheet 2

INVENTOR.
R. W. Richards.
BY E. W. Anderson Jr.
ATTORNEY.

Patented June 21, 1927.

1,633,275

UNITED STATES PATENT OFFICE.

RALPH W. RICHARDS, OF ATCHISON, KANSAS.

AWNING FOR WINDOWS.

Application filed September 15, 1926. Serial No. 135,595.

The invention has relation to a sun shade or awning for windows, and particularly for the side windows of automobiles, having for an object to provide a shade supporting framework of rod-metal of light skeleton character, which shall be adjustable for length to enable it to be attached to different makes of cars, and which shall be rigid against the vibration of the automobile in traveling.

The invention consists in the novel construction and combinations of parts as set forth in the appended claims.

Figure 6:
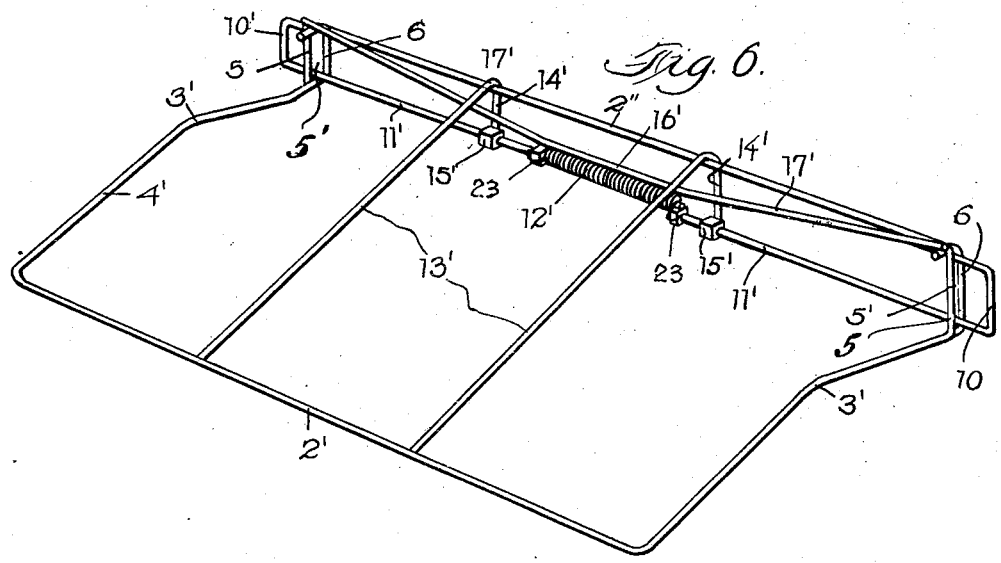
Figure 7:
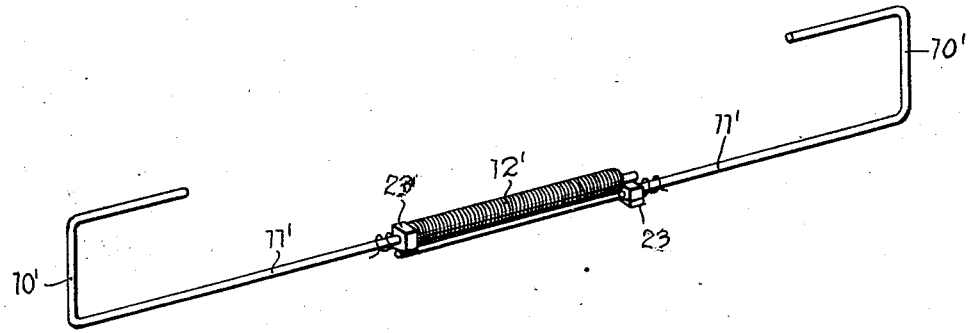

In the accompanying drawings, illustrating an embodiment of the invention, Figure 1 is a perspective view of the shade supporting framework; Figure 2 is a side view of the same; Figure 3 is a similar view showing the shade or covering in section; Figure 4 is a rear view of the framework partly broken away; Figure 5 is a plan view of the same; Figure 6 is a perspective view showing a modification; and Figure 7 is a detail perspective view.

In these drawings, the numeral 1 designates the main frame having forward and rear horizontal rods 2, 2', in an inclined plane and connected by side rods 3, the latter having each oppositely inclined forward and rear portions 4, 4', the forward of which is in the same inclined plane as said horizontal rods 2, 2'. Each side rod is also provided with a rear vertical arm 5 and with an adjacent angle piece 6, having a vertical arm 11 spaced from and adjacent to vertical arm 5, and forming therewith a guideway 5'. Each angle piece is made rigid with the main frame by having upper and lower horizontal arms 8 connected or welded to the rear upper and lower corners of the main frame and bracing said corners.

Working in the guideway 5' are vertical reversely bent or looped end portions 10 of laterally extensible frame, the latter having a lower horizontal arm 11 composed of threaded sections connected by a turnbuckle 12.

Intermediate brace rods 13 for the main frame connect and are in the same inclined plane as the forward and rear horizontal rods thereof and are provided with rear vertical arms 14, rigidly connected or welded to collars 15, slidable upon the threaded sections adjacent said turnbuckle and thereby bracing said sections.

A truss rod 16 has a central horizontal portion rigidly connected or welded to the vertical arms 14 of said brace rods and oppositely inclined end portions 17 rigidly connected or welded to the upper rear corners of the main frame and to the upper horizontal arms of angle pieces 6.

The outer vertical arms of the looped end portions of the extensible frame are engageable in the glass grooves of the side window of an automobile or in the sash groove of any window, and will support the awning in position to shade the window, the said frame by means of its turnbuckle being suitably adjusted to cause the vertical end portions 10 to press against the vertical outer walls of the groove.

The main frame is made more rigid by the oppositely inclined forward and rear portions of the side bars; by the angle pieces having upper and lower horizontal portions connected as stated, by the intermediate brace rods and by the truss rods. The lower horizontal arm of the laterally extensible frame is braced by the rear vertical arms of the intermediate brace rods, and said rear vertical arms are in turn braced by the truss rod, so that the entire structure is very rigid.

The means of connection of the shade supporting frame with the automobile are regarded as a practically perfect fastening that cannot be jarred loose by the constant vibration of the automobile.

The covering or shade proper 19 is provided with a forward pocket 20 which slips over the main frame, the rear edge of the covering having a short piece of tape 21 provided with snap buttons 22, which fasten around the rear horizontal rod 2', thereby stretching or tensioning the covering over the frame.

A modification of the invention is shown in Figures 6 and 7 of the drawings wherein the laterally extensible frame has an expansion spring 12' substituted for the turnbuckle, the sections 11' of the lower horizontal arm of said frame lapping each other and having through collars 23 slidable upon the rod sections connection with the ends of said spring, the latter holding said frame normally expanded. In making the adjustment the sections 11 of the said arm are pressed inwardly against the tension of said spring, and the vertical arms of the reversely bent end portions 10' engaged with the glass groove of the automobile side window.

I claim:—

1. In a window awning, a rod-metal shade supporting framework comprising a main frame having forward and rear horizontal rods and side rods the latter having each spaced vertical arms forming a guideway, an endwise extensible sectional rod having at each end a vertical reversely bent portion working in said guideway the sections of said rod having an adjustable connection, collars slidable upon the rod sections, and intermediate brace rods for the main frame having vertical arms connected to said collars and bracing said threaded sections.

2. In a window awning, a rod-metal shade supporting framework, comprising a main frame having forward and rear horizontal rods and side rods, the latter having each oppositely inclined forward and rear portions and rear spaced vertical arms forming a guideway, endwise extensible sectional rod having at each end a vertical reversely bent portion working in said guideway, the sections of said rod having an adjustable connection, collars slidable upon the rod sections adjacent said adjustable connection, intermediate brace rods for the main frame having inclined arms in the same plane as the forward portions of said side rods and vertical arms connected to said collars and bracing said rod sections, and a truss rod having a central horizontal portion connecting the vertical arms of said brace rods and oblique portions connected to the upper rear corners of said main frame.

3. In a window awning, a rod-metal shade supporting framework comprising a main frame having forward and rear horizontal rods and side rods, the latter having each oppositely inclined forward and rear arms and a vertical arm, angle pieces having each a vertical arm in rear of and spaced from the related vertical arm of said side rod to form a guideway and horizontal arms connected to and bracing the upper and lower rear corners of said main frame, an endwise extensible sectional rod having at each end a vertical reversely bent portion working in said guideway the sections of said rod having an adjustable connection, collars slidable upon said threaded sections, intermediate brace rods for the main frame having vertical arms connected to said collars and bracing said rod sections, and a truss rod having a central horizontal portion connected to the vertical arms of said brace rods and oblique portions connected to the upper corners of said main frame and to said angle pieces.

In testimony whereof I affix my signature.

RALPH W. RICHARDS.